US012243466B2

(12) United States Patent
Hsieh et al.

(10) Patent No.: US 12,243,466 B2
(45) Date of Patent: Mar. 4, 2025

(54) ELECTRONIC DEVICE AND DRIVING METHOD THEREOF

(71) Applicant: Innolux Corporation, Miaoli County (TW)

(72) Inventors: Yao-Lien Hsieh, Miaoli County (TW); Chien-Hung Chan, Miaoli County (TW); Meng-Chang Tsai, Miaoli County (TW); Chan-Feng Chiu, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 18/154,845

(22) Filed: Jan. 15, 2023

(65) Prior Publication Data

US 2023/0267870 A1 Aug. 24, 2023

(30) Foreign Application Priority Data

Feb. 23, 2022 (CN) ......................... 202210169082.7

(51) Int. Cl.
*G09G 3/20* (2006.01)

(52) U.S. Cl.
CPC ..... *G09G 3/2074* (2013.01); *G09G 2320/043* (2013.01); *G09G 2360/16* (2013.01)

(58) Field of Classification Search
CPC ......... G09G 2320/043; G09G 2360/16; G09G 3/2074; G09G 2320/0285
See application file for complete search history.

(56) References Cited

U.S. PATENT DOCUMENTS

| | | | | |
|---|---|---|---|---|
| 11,288,995 | B2 * | 3/2022 | Hou | G09G 3/2011 |
| 11,341,889 | B2 * | 5/2022 | Seo | G09G 3/3258 |
| 11,393,374 | B2 * | 7/2022 | Seo | G09G 3/2007 |
| 2017/0278464 | A1 * | 9/2017 | Guo | G09G 3/3413 |
| 2018/0137830 | A1 * | 5/2018 | Lee | G09G 3/3614 |
| 2020/0335028 | A1 * | 10/2020 | Yang | G09G 3/2074 |
| 2021/0287620 | A1 * | 9/2021 | Kim | G09G 3/3688 |
| 2021/0295756 | A1 * | 9/2021 | Hou | G09G 3/2011 |
| 2021/0407364 | A1 * | 12/2021 | Seo | G09G 3/3233 |

(Continued)

FOREIGN PATENT DOCUMENTS

| | | | | |
|---|---|---|---|---|
| CN | 104732952 | | 6/2015 | |
| CN | 105304052 A | * | 2/2016 | |
| CN | 106531050 A | * | 3/2017 | G09G 3/20 |

(Continued)

OTHER PUBLICATIONS

"Office Action of Taiwan Counterpart Application", issued on Jun. 28, 2023, p. 1-p. 6.

*Primary Examiner* — Ricardo Osorio
(74) *Attorney, Agent, or Firm* — JCIPRNET

(57) ABSTRACT

The present disclosure provides an electronic device and a driving method thereof. The electronic device includes a pixel compensation circuit and a display panel. The pixel compensation circuit receives a pixel signal. The pixel signal includes multiple sub-pixel gray-scale values. The pixel compensation circuit compensates the sub-pixel gray-scale value according to the difference between the sub-pixel gray-scale values and the first threshold value to output an adjusted pixel signal. The display panel displays an image screen according to the adjusted pixel signal.

12 Claims, 7 Drawing Sheets

(56) References Cited

U.S. PATENT DOCUMENTS

| | | | | |
|---|---|---|---|---|
| 2023/0122681 | A1 * | 4/2023 | Park | G09G 3/3233 345/690 |

FOREIGN PATENT DOCUMENTS

| | | | | | |
|---|---|---|---|---|---|
| CN | 111769147 | A | * | 10/2020 | G09F 9/30 |
| CN | 109523954 | B | * | 12/2020 | G09G 3/3225 |
| CN | 111161677 | B | * | 6/2021 | G09G 3/2018 |
| CN | 113658538 | A | * | 11/2021 | |
| TW | 200941438 | | | 10/2009 | |
| WO | WO-2021062604 | A1 | * | 4/2021 | G09G 3/006 |
| WO | WO-2023035370 | A1 | * | 3/2023 | |

* cited by examiner

| sub-pixel gray-scale values before compensation | compensated gray-scale values |
|---|---|
| 0 | X1 |
| 1 | X2 |
| ⋮ | ⋮ |
| 255 | X256 |

300

FIG. 3

ELECTRONIC DEVICE AND DRIVING METHOD THEREOF

CROSS-REFERENCE TO RELATED APPLICATION

This application claims the priority benefit of China application serial no. 202210169082.7, filed on Feb. 23, 2022. The entirety of the above-mentioned patent application is hereby incorporated by reference herein and made a part of this specification.

BACKGROUND

Field of the Disclosure

The present disclosure relates to a driving method of an electronic device, and in particular, to a display device and a driving method thereof.

Description of Related Art

In the related art, when an electronic device is a display device and has a display panel, there may be many ways of arranging the pixels of the display panel. One arrangement method is that the same data line is electrically connected to the sub-pixel circuit in the same column, and the sub-pixel circuit in the same column controls sub-pixels of the same color (the first arrangement); the other method is that the sub-pixel circuit electrically connected to the same data line is located in different sub-pixel columns, and the sub-pixel circuits located in different columns have different colors (second arrangement).

In the first arrangement, when the display panel displays an image screen with a gray background and a large area of pure color region, the pure color region in the image screen is very likely to affect the display quality of other regions displaying gray background in the vertical direction. In the second arrangement, if the resistance and capacitance of the data lines are large, the display quality of the image screen will be more likely to be affected.

In the related art, in order to improve the display quality of an image screen, a buffer circuit with high hardware cost needs to be adopted to store the image screen to be displayed, and the compensated gray-scale value of the image screen needs to be calculated in a complex way.

SUMMARY OF THE DISCLOSURE

The present disclosure provides an electronic device and a driving method for a display device, which may determine the compensated gray-scale value of the sub-pixel gray-scale value through a pixel compensation circuit with low cost, so as to improve the display quality of the image screen.

The electronic device of the present disclosure includes a pixel compensation circuit and a display panel. The pixel compensation circuit receives a pixel signal. The pixel signal includes a plurality of sub-pixel gray-scale values. The pixel compensation circuit compensates the sub-pixel gray-scale values according to the difference between the sub-pixel gray-scale values and the first threshold to output an adjusted pixel signal. The display panel displays an image screen according to the adjusted pixel signal.

In an embodiment of the present disclosure, when the sub-pixel gray-scale value is less than or equal to the first threshold, and the difference between the multiple sub-pixel gray-scale values is greater than or equal to the second threshold, the pixel compensation circuit determines to compensate the sub-pixel gray-scale value.

In an embodiment of the present disclosure, the pixel compensation circuit compensates the sub-pixel gray-scale value according to the compensated gray-scale value, and the sum of the compensated gray-scale value and the sub-pixel gray-scale value is less than or equal to the reference gray-scale value.

In an embodiment of the present disclosure, the compensated gray-scale value is a fixed value.

In an embodiment of the present disclosure, the compensated gray-scale value is determined according to a sub-pixel gray-scale value.

The driving method for an electronic device of the present disclosure includes: receiving a pixel signal, and the pixel signal includes a plurality of sub-pixel gray-scale values; determining a compensated gray-scale value of the sub-pixel gray-scale value according to the sub-pixel gray-scale values; compensating the sub-pixel gray-scale values according to the compensated gray-scale value to output an adjusted pixel signal, and the sum of the compensated gray-scale value and the sub-pixel gray-scale value is less than or equal to the reference gray-scale value; and driving the display panel to display an image screen according to the adjusted pixel signal.

In an embodiment of the present disclosure, the driving method of the electronic device further includes: when the sub-pixel gray-scale value is less than or equal to the first threshold, and the difference between the sub-pixel gray-scale values is greater than or equal to the second threshold, it is determined to compensate the sub-pixel gray-scale value.

In an embodiment of the present disclosure, the sum of the compensated gray-scale value and the sub-pixel gray-scale value is less than or equal to the reference gray-scale value.

In an embodiment of the present disclosure, the compensated gray-scale value is a fixed value.

In an embodiment of the present disclosure, the compensated gray-scale value is determined according to the sub-pixel gray-scale value.

In order to make the foregoing description more understandable, several embodiments with accompanying drawings are described in detail below.

BRIEF DESCRIPTION OF THE DRAWINGS

FIG. 3 shows a schematic diagram of a lookup table of sub-pixel gray-scale values and compensated gray-scale values according to an embodiment of the present disclosure.

DESCRIPTION OF EMBODIMENTS

Figure 1:
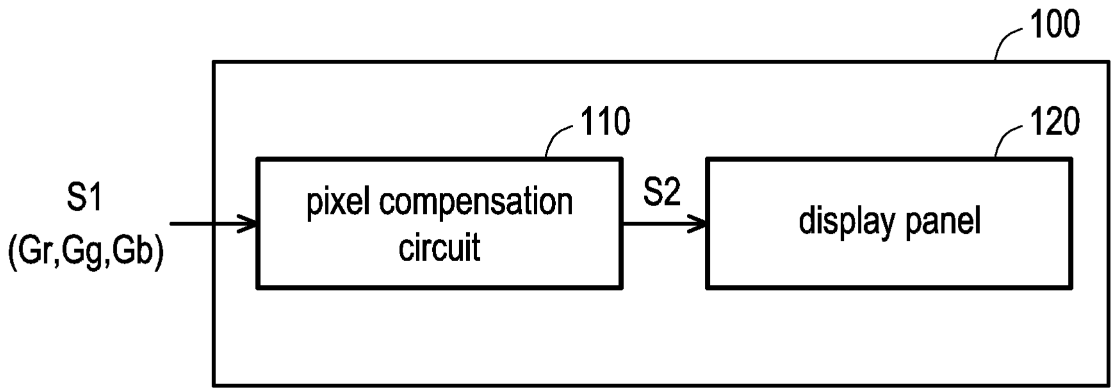
FIG. 1 shows a schematic block diagram of an electronic device according to an embodiment of the present disclosure.

The disclosure can be understood by referring to the following detailed description in combination with the accompanying drawings. It should be noted that in order to make it easy for the reader to understand and for the simplicity of the drawings, the multiple drawings in this disclosure only depict a part of the electronic device, and the specific components in the drawings are not drawn according to actual scale. In addition, the number and size of each component in the drawings are only for exemplary purpose, and are not intended to limit the scope of the disclosure.

In the following description and claims, the words "comprising" and "including" are open-ended words, and thus should be interpreted as meaning "including but not limited to . . . ".

It should be understood that although the terms "first", "second", "third" . . . may be used to describe various constituent elements, the constituent elements are not limited by such terms. This term is only used to distinguish a single element from other elements in the specification. The same terms may not be used in the claims, but replaced by first, second, third . . . in the order in which the elements are mentioned in the claims. Therefore, in the following description, the first constituent element may be the second constituent element in the claims.

In some embodiments of the present disclosure, terms related to joining and connecting, such as "connected", "interconnected", etc., unless otherwise defined, may mean that the two structures are in direct contact, or may also mean that the two structures are not in direct contact, and there are other structures located between these two structures. And the terms regarding joining and connecting may also refer to the circumstances where both structures are movable, or both structures are fixed. Furthermore, the term "coupled" refers to any direct and indirect electrical connection.

The electronic device of the present disclosure may include, but is not limited to, a display device, an antenna device, a sensing device, a light-emitting device, or a tiling device. Electronic devices may include bendable or flexible electronic devices. Electronic devices may include electronic components. The electronic device includes, for example, a liquid crystal layer or a light emitting diode (LED). Electronic components may include passive components and active components, such as capacitors, resistors, inductors, variable capacitors, filters, diodes, transistors, inductors, MEMS, liquid crystal chips, controllers, etc., but not limited thereto. The diodes may include light emitting diodes or photodiodes. Light emitting diodes may include, for example, organic light emitting diodes (OLEDs), mini LEDs, micro LEDs, quantum dot LEDs, fluorescence, phosphor or other suitable materials, or a combination of the above, but not limited thereto. Sensors may include, for example, capacitive sensors, optical sensors, electromagnetic sensors, fingerprint sensors (FPS), touch sensors, antennas, or pen sensors, etc., but not limited thereto. The controller may include, for example, a timing controller, etc., but is not limited thereto. Hereinafter, a display device will be used as an electronic device in the description of the present disclosure, but the present disclosure is not limited thereto.

Reference will now be made in detail to the exemplary embodiments of the present disclosure, examples of which are illustrated in the accompanying drawings. Wherever possible, the same reference numerals are used in the drawings and description to refer to the same or like parts.

FIG. 1 is a schematic block diagram of an electronic device according to an embodiment of the present disclosure. Please refer to FIG. 1, the electronic device 100 includes a pixel compensation circuit 110 and a display panel 120. The pixel compensation circuit 110 receives a pixel signal S1 and outputs an adjusted pixel signal S2. The pixel signal S1 includes a plurality of sub-pixel gray-scale values (Gr, Gg, Gb), where Gr is, for example, a red sub-pixel gray-scale value, Gg is, for example, a green sub-pixel gray-scale value, and Gb is, for example, a blue sub-pixel gray-scale value, but not limited thereto. The pixel compensation circuit 110 determines the compensated gray-scale value of the sub-pixel gray-scale value according to a difference between the sub-pixel gray-scale values (Gr, Gg, Gb) and a first threshold TH01. For example, it is determined that if the red sub-pixel gray-scale value Gr and/or the blue sub-pixel gray-scale value Gb need to be compensated (i.e., the compensated gray-scale value is greater than 0), the compensated sub-pixel gray-scale value includes the red sub-pixel gray-scale value Gr and/or the blue sub-pixel gray-scale value Gb. The compensated sub-pixel gray-scale value may be at least one sub-pixel gray-scale value among sub-pixel gray-scale values (Gr, Gg, Gb), but not limited thereto.

The display panel 120 receives the adjusted pixel signal S2 output by the pixel compensation circuit 110. The display panel 120 displays an image screen according to the adjusted pixel signal S2. The adjusted pixel signal S2 may be a compensated pixel signal or an uncompensated pixel signal (i.e., the compensated gray-scale value is equal to 0, which is equal to the pixel signal S1).

In this embodiment, the pixel compensation circuit 110 is provided in, for example, a timing controller or a source driver, but the present disclosure is not limited thereto. The pixel compensation circuit 110 may be designed by using a hardware description language (HDL) or any other circuit design methods well known to those skilled in the art, and may be a circuit structure implemented by using a field programmable gate array (FPGA), a complex programmable logic device (CPLD), or an application-specific integrated circuit (ASIC), but the present disclosure is not limited thereto.

Figure 2:
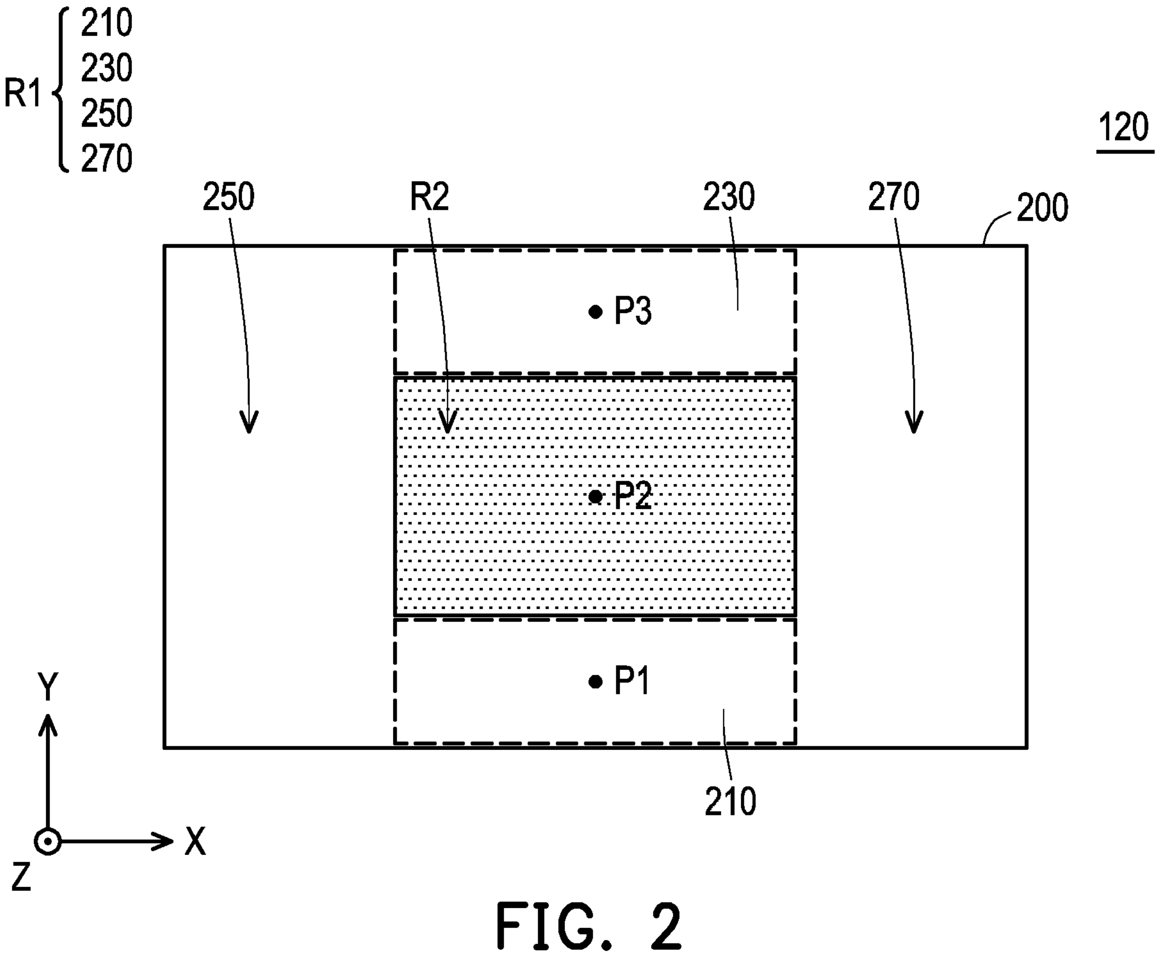
FIG. 2 shows a schematic diagram of an image screen displayed by a display panel according to an embodiment of the present disclosure.

FIG. 2 shows a schematic diagram of an image screen displayed by a display panel according to an embodiment of the present disclosure. Please refer to FIG. 1 and FIG. 2, the display panel 120 receives the adjusted pixel signal S2 output by the pixel compensation circuit 110 to display the image screen 200. In this embodiment, the image screen 200 includes a region R1 and a region R2. The region R1 encloses the region R2, and the region R1 includes a sub-region 210, a sub-region 230, a sub-region 250, and a sub-region 270. The region R1 is, for example, an image region where each sub-pixel gray-scale value is 51, where the sub-pixel gray-scale values (Gr, Gg, Gb) of the pixel P1 and the pixel P3 are (51, 51, 51) respectively. The pixel P1 may be any pixel in the sub-region 210, and the pixel P3 may be any pixel in the sub-region 230. The pixel signal S1 may be provided to the region R2 before being compensated by the pixel compensation circuit 110, for example to display a single color, such as an image region that displays green, where the sub-pixel gray-scale values (Gr, Gg, Gb) of the pixel signal S1 provided to the pixel P2 before compensation are (0, 255, 0). The pixel P2 may be any pixel in the region R2.

In order to reduce the problem that the pixel signal of the display region R2 affects the pixel signal of the sub-region 210 and/or the sub-region 230 and affects the display quality, the pixel compensation circuit 110 may compensate the pixel signal of the pixel P2 in the display region R2. For example, the pixel compensation circuit 110 may adjust the sub-pixel gray-scale value of the pixel P2 to (X1, 255, X1), where X1 is the compensated gray-scale value. In an embodiment, the compensated gray-scale value X1 may be a fixed value. That is to say, no matter what the sub-pixel gray-scale value is before compensation, the compensated gray-scale value is all the same, that is, X1.

Alternatively, in an embodiment, the compensated gray-scale value may also be determined according to the magnitude of the sub-pixel gray-scale value. FIG. 3 shows an embodiment of the present disclosure, that is, a schematic diagram of a look-up table (LUT) of the sub-pixel gray-scale value before compensation and the compensated gray-scale value. Please refer to FIG. 3, the look-up table 300 presents the correspondence between the sub-pixel gray-scale value before compensation and the compensated gray-scale value. The sub-pixel gray-scale value before compensation includes, for example, 0, 1 to 255, and the compensated gray-scale value includes, for example, X1, X2 to X255. In the embodiment of FIG. 2, the compensated gray-scale value may also be determined according to the look-up table. For example, when the sub-pixel gray-scale value before compensation is 0, the compensated gray-scale value is X1; when the sub-pixel gray-scale value before compensation is 1, the compensated gray-scale value is X2, and so on. When the sub-pixel gray-scale value before compensation is 255, the compensated gray-scale value is X256.

The following describes how the pixel compensation circuit 110 determines the compensated gray-scale value of the sub-pixel according to the difference between the sub-pixel gray-scale values (Gr, Gg, Gb) and the first threshold TH01.

In the embodiment of FIG. 2, when the sub-pixel gray-scale value before compensation is less than or equal to the first threshold TH01, and when the difference between the sub-pixel gray-scale value and the sub-pixel gray-scale value on the adjacent two sides in the horizontal direction is greater than or equal to the second threshold TH02, the pixel compensation circuit 110 determines to compensate the sub-pixels and determines the compensated gray-scale value. In an embodiment, the first threshold TH01 is, for example, 100, and the second threshold TH02 is, for example, 10, but not limited thereto. Taking Gr among the sub-pixel gray-scale values (Gr, Gg, Gb) of the pixel P2 as an example, if the sub-pixel gray-scale value Gr=0 before compensation, which is less than the first threshold TH01, and the difference between the sub-pixel gray-scale value Gr and the sub-pixel gray-scale value Gg of the pixel P2 is 255 and the difference between the sub-pixel gray-scale value Gr and the sub-pixel gray-scale value Gb among the sub-pixel gray-scale values (Gr, Gg, Gb) of another pixel on the left side is 0, as the differences are 0 and 255, and the larger of the difference (255) is greater than the second threshold TH02, the pixel compensation circuit 110 determines to compensate the sub-pixel gray-scale value Gr, and determines the compensated gray-scale value to be X1 according to the look-up table 300. Take the Gb among the sub-pixel gray-scale values (Gr, Gg, Gb) of the pixel P2 as an example. If the sub-pixel gray-scale value Gb before compensation is 0, which is less than the first threshold TH01, and the difference between the sub-pixel gray-scale value Gb and the sub-pixel gray-scale value Gg of the pixel P2 is 255 and the difference between the sub-pixel gray-scale value Gb and Gr among the sub-pixel gray-scale values (Gr, Gg, Gb) of another pixel on the right side is 0, as the differences are 0 and 255, and the larger of the difference (255) is greater than the second threshold TH02, the pixel compensation circuit 110 determines to compensate the sub-pixel gray-scale value Gb, and determines the compensated gray-scale value to be X1 according to the look-up table 300. Take Gg among the sub-pixel gray-scale values (Gr, Gg, Gb) of the pixel P2 as another example. If the sub-pixel gray-scale value Gg before compensation Gg=255, which is greater than the first threshold TH01, then the pixel compensation circuit 110 will not compensate the sub-pixel gray-scale value Gg. In other words, the compensated gray-scale value is 0, so the sub-pixel gray-scale value Gg is still 255. Therefore, the compensated sub-pixel gray-scale values of the pixel P2 are (X1, 255, X1).

Figure 4A:
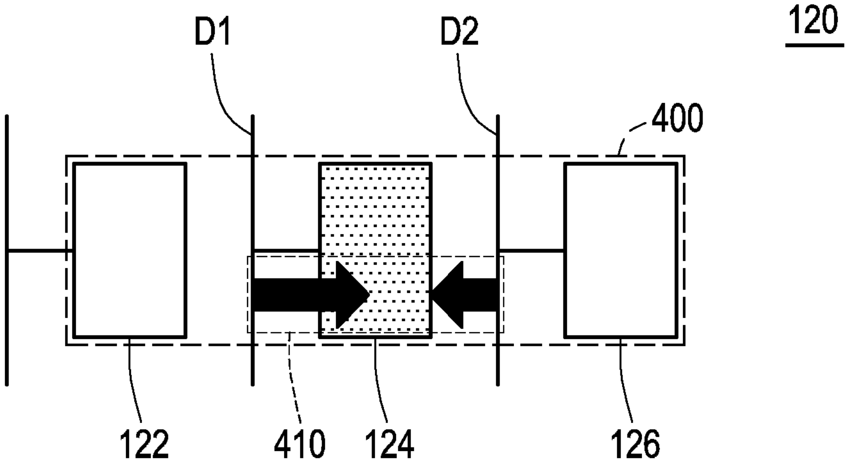
FIG. 4A shows a schematic diagram of a pixel on a display panel according to an embodiment of the present disclosure.

FIG. 4A shows a schematic diagram of a pixel on a display panel according to an embodiment of the present disclosure. Referring to FIG. 4A, the display panel 120 includes at least one pixel 400. The pixel 400 includes a red sub-pixel 122, a green sub-pixel 124, and a blue sub-pixel 126, but is not limited thereto. Please refer to FIG. 2 at the same time. The pixel P2 in FIG. 2 may be equivalent to the pixel 400. Before compensation, the gray-scale values displayed by the green sub-pixel 124 and the blue sub-pixel 126 are quite different. Therefore, the difference between the data voltages to be written to the data line D1 (corresponding to the green sub-pixel 124) and the data line D2 (corresponding to the blue sub-pixel 126) is also large, as shown by the two arrows 410 in FIG. 4A. Since the difference between the data voltages written in the data line D1 and the data line D2 is relatively large, the pixel P1 and/or the pixel P3 will be affected. That is, when the display panel 120 displays the image screen 200, if the gray-scale value of the region R2 is not compensated, the display quality of the sub-region 210 and/or the sub-region 230 might be affected.

Figure 4B:
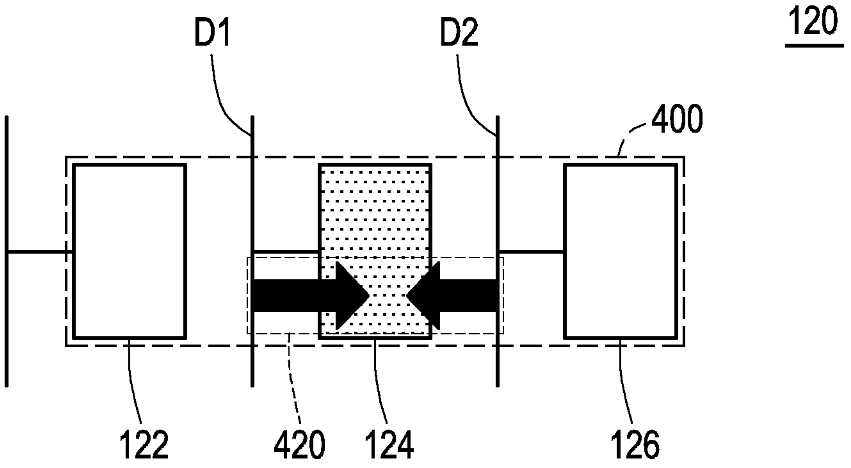
FIG. 4B shows a schematic diagram of a pixel on a display panel according to another embodiment of the present disclosure.

FIG. 4B shows a schematic diagram of a pixel on a display panel according to another embodiment of the present disclosure. Please refer to FIG. 4B. In FIG. 4B, the gray-scale value of the sub-pixels in the display region R2 is compensated by the gray-scale compensation method provided by the embodiment of the present disclosure. For example, increasing the data voltage written into the data line D2 may reduce the difference between the data voltages written into the data line D1 and the data line D2, as shown by the two arrows 420 in FIG. 4B. Therefore, the pixel compensation circuit 110 may compensate the pixels P2 in the display region R2. Accordingly, when the display panel 120 displays the image screen 200, it is possible to reduce the chance for the pixel signals of the display region R2 to affect the pixel signals of the sub-region 210 and/or the sub-region 230, thus preventing the display quality from being affected.

Figure 5:
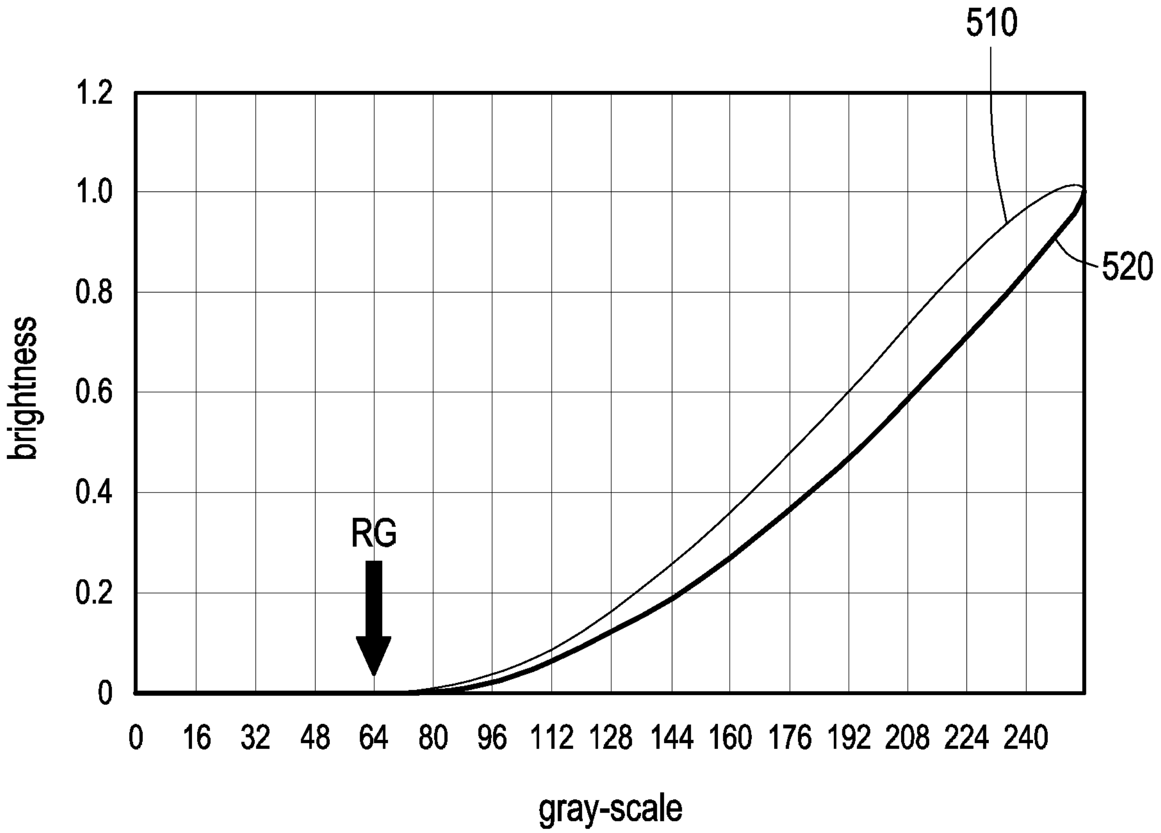
FIG. 5 shows a corresponding relationship diagram between pixel gray-scale and brightness according to an embodiment of the present disclosure.

FIG. 5 shows a corresponding relationship diagram between pixel gray-scale and brightness according to an embodiment of the present disclosure, where the curve 510 is the brightness curve of the electronic device when viewed from a side perspective, and the curve 520 is the brightness curve of the electronic device when viewed from a front perspective. Please refer to FIG. 2 and FIG. 5. In FIG. 2, the pixel compensation circuit 110 adjusts the sub-pixel gray-scale value according to the compensated gray-scale value, where the sum of the compensated gray-scale value and the sub-pixel gray-scale value may be less than or equal to the reference gray-scale value to prevent the display quality from being affected. The reference gray-scale value is, for example, the RG point as shown in FIG. 5, and which, for example, corresponds to the gray-scale value 64, but not limited thereto.

Figure 6:
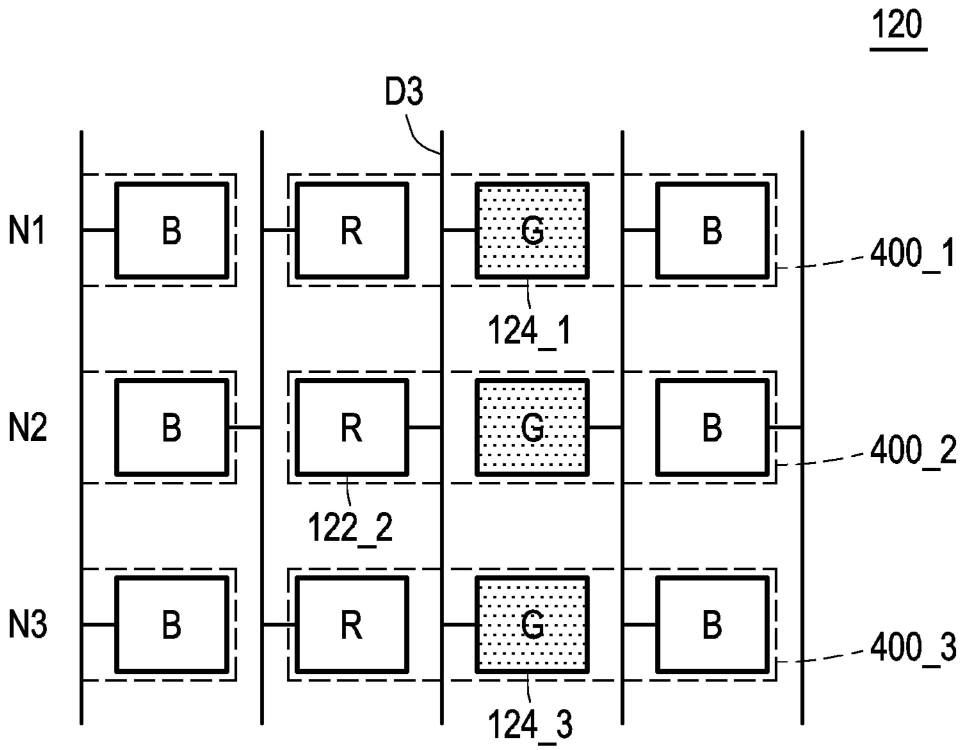
FIG. 6 shows a schematic diagram of a pixel on a display panel according to another embodiment of the present disclosure.
Figure 7:
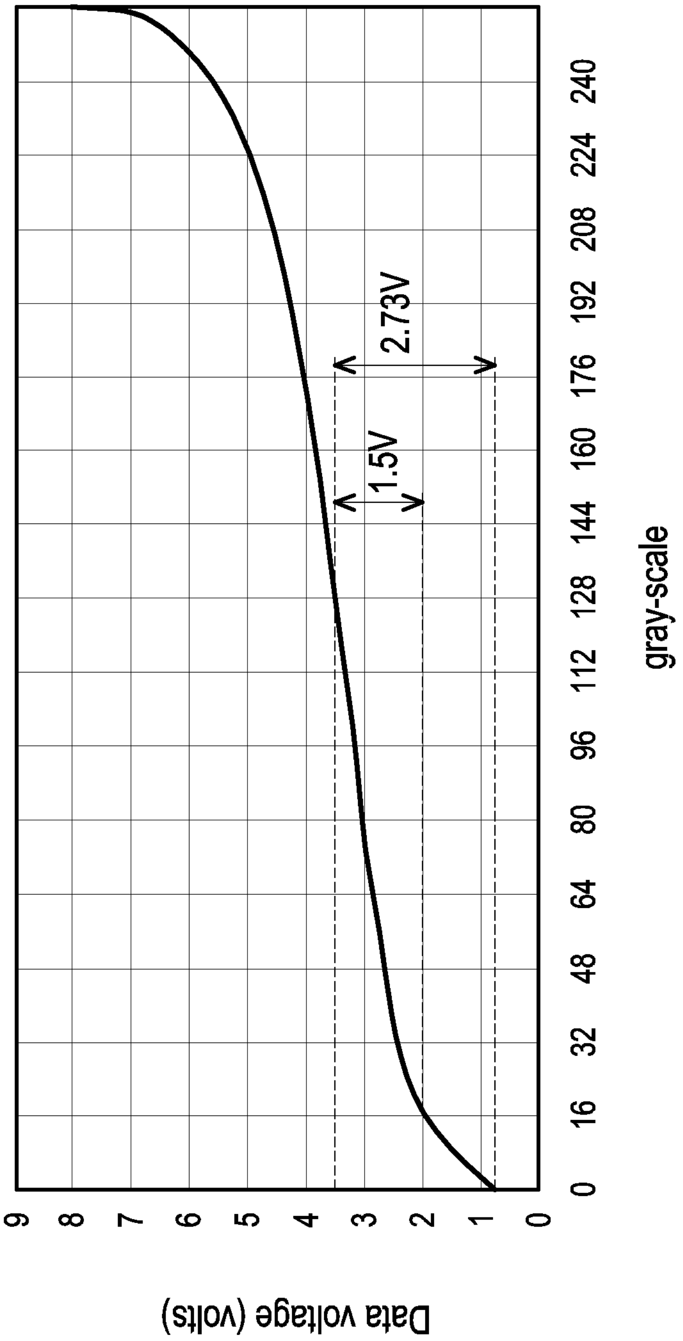
FIG. 7 shows a corresponding curve diagram of gray-scale value and data voltage according to another embodiment of the present disclosure.

FIG. 6 shows a schematic diagram of a pixel on a display panel according to another embodiment of the present disclosure. FIG. 7 shows a corresponding curve diagram of gray-scale value and data voltage according to another embodiment of the present disclosure. Please refer to FIG. 1, FIG. 6, and FIG. 7, the display panel 120 includes a plurality of pixels, such as a pixel 400_1, a pixel 400_2, and a pixel 400_3. In this embodiment, the same data line is electrically connected to sub-pixels located in different pixel columns. Taking the data line D3 as an example, in the pixel row N1, the data line D3 is electrically connected to the green sub-pixel 124_1 on its right side, and in the pixel row N2, the data line D3 is electrically connected to the red sub-pixel 122_2 on its left side. In the pixel row N3, the data line D3 is electrically connected to the green sub-pixel 124_3 on its right side.

When the display panel 120 is to display a green screen, for example, the gray-scale value of the green sub-pixel is 128, the gray-scale value of the red sub-pixel and the gray-scale value of the blue sub-pixel are 0, and the data voltages written into the data line D3 correspond to the green sub-pixel 124_1, the red sub-pixel 122_2 and the green sub-pixel 124_3 in sequence. Therefore, the data voltage written into the data line D3 will be significantly different, which is about 2.73 volts as shown in FIG. 7. Therefore, if the charging capability of the driving circuit for the data line is insufficient, the display quality of the display screen will be affected.

Therefore, in this embodiment, the pixel compensation circuit 110 determines the compensated gray-scale value of the sub-pixels according to the difference between the sub-pixel gray-scale values (Gr, Gg, Gb) and the first threshold TH01. For example, when the display panel 120 is to be displayed in green and the gray-scale value is 128, the sub-pixel gray-scale values (Gr, Gg, Gb) of one pixel before compensation are (0, 128, 0). Take the sub-pixel gray-scale value Gr as an example, the sub-pixel gray-scale value Gr before compensation is less than the first threshold TH01 (for example, 100), the difference between the sub-pixel gray-scale value Gr and the sub-pixel gray-scale value Gg is 128, and the difference between the sub-pixel gray-scale value Gr and Gb among the sub-pixel gray-scale values (Gr, Gg, Gb) of another pixel on the left side is 0, as the differences are 0 and 128, and the larger of the difference (128) is greater than the second threshold TH02 (e.g., 10), the pixel compensation circuit 110 determines to compensate the sub-pixel gray-scale value Gr. For example, the compensated gray-scale value may be 16. Take the sub-pixel gray-scale value Gb as another example, the sub-pixel gray-scale value Gb before compensation is Gb=0, which is less than the first threshold TH01 (for example, 100), the difference between the sub-pixel gray-scale value Gb and the sub-pixel gray-scale value Gg is 128, and the difference between the sub-pixel gray-scale value Gb and Gr among the sub-pixel gray-scale values (Gr, Gg, Gb) of another pixel on the right side is 0, as the differences are 0 and 128, and the larger of the difference (128) is greater than the second threshold TH02 (for example, 10), the pixel compensation circuit 110 determines to compensate the sub-pixel gray-scale value Gb. For example, the compensated gray-scale value may be 16. Take the sub-pixel gray-scale value Gg as another example. The sub-pixel gray-scale value Gg before compensation is Gg=128, which is greater than the first threshold TH01 (for example, 100). Therefore, the pixel compensation circuit 110 will not compensate the sub-pixel gray-scale value Gg. In other words, the compensated gray-scale value is 0, so the sub-pixel gray-scale value Gg is still 128. Therefore, when the display panel 120 is to be displayed in green, the compensated sub-pixel gray-scale values are (16, 128, 16). Similarly, when the display panel 120 is to display a red display screen or a blue display screen, the pixel compensation circuit 110 may perform the same processing, so as to solve the problem of display quality degradation of the display panel.

Therefore, the data voltage written into the data line D3 may be switched from the data voltage corresponding to the green sub-pixel gray-scale value 128 to the data voltage corresponding to the red sub-pixel gray-scale value 16. Referring to FIG. 7, it can be seen that the difference between the data voltages is about 1.5 volt. Therefore, the difference between the data voltages of the compensated sub-pixel gray-scale values is small, which makes it possible to prevent the display quality of the display screen from being affected when the driving circuit has insufficient charging capability for the data lines.

Figure 8:
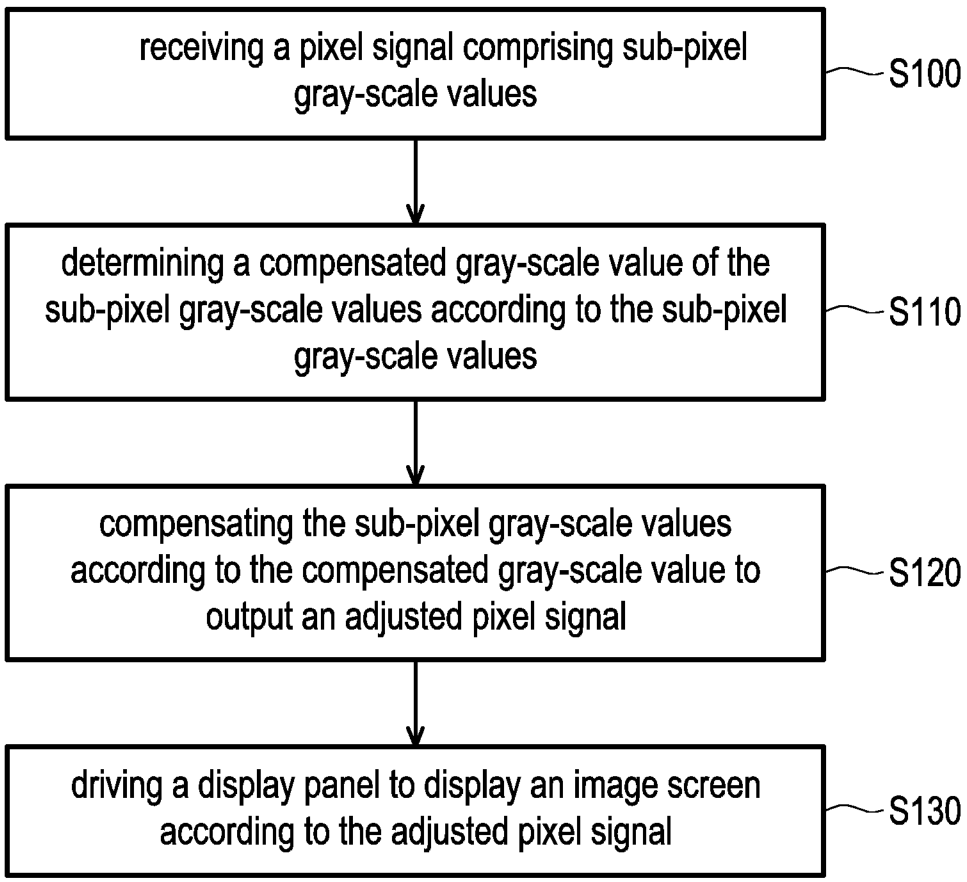
FIG. 8 shows a flowchart of steps of a driving method for an electronic device according to an embodiment of the present disclosure.

FIG. 8 shows a flowchart of steps of a driving method for an electronic device according to an embodiment of the present disclosure. Please refer to FIG. 1 and FIG. 8, in step S100, the pixel compensation circuit 110 receives the pixel signal S1. The pixel signal S1 includes a plurality of sub-pixel gray-scale values (Gr, Gg, Gb), where Gr is a red sub-pixel gray-scale value, Gg is a green sub-pixel gray-scale value, and Gb is a blue sub-pixel gray-scale value. In step S110, the pixel compensation circuit 110 determines the compensated gray-scale value of the sub-pixel gray-scale value according to the sub-pixel gray-scale values (Gr, Gg, Gb), respectively. In step S120, the pixel compensation circuit 110 compensates the sub-pixel gray-scale value according to the compensated gray-scale value to output the adjusted pixel signal S2. The sum of the compensated gray-scale value and the sub-pixel gray-scale value may be less than or equal to the reference gray-scale value. The reference gray-scale value is, for example, the RG point in FIG. 5, and which, for example, corresponds to the gray-scale value 64. In step S130, the pixel compensation circuit 110 drives the display panel 120 to display the image screen 200 according to the adjusted pixel signal S2.

To sum up, in the embodiment of the present disclosure, the pixel compensation circuit determines the compensated gray-scale value of the sub-pixel according to the difference between the sub-pixel gray-scale values and the first threshold. Therefore, the compensated gray-scale values of different sub-pixel gray-scale values may be determined through a pixel compensation circuit with low cost, so as to improve the display quality of the image screen.

Finally, it should be noted that the above embodiments are only used to illustrate the technical solutions of the present disclosure, but not to limit them. Although the present disclosure has been described in detail with reference to the foregoing embodiments, those of ordinary skill in the art should understand that: The technical solutions described in the foregoing embodiments can still be modified, or some or all of the technical features thereof can be equivalently replaced; and these modifications or replacements do not make the essence of the corresponding technical solutions deviate from the scope of the technical solutions of the embodiments of the present disclosure.

What is claimed is:

1. An electronic device, comprising:

a pixel compensation circuit, which receives a pixel signal, wherein the pixel signal comprises a plurality of sub-pixel gray-scale values, wherein the pixel compensation circuit compensates the plurality of sub-pixel gray-scale values based on a determination result to output an adjusted pixel signal, wherein the determination result indicates that the plurality of sub-pixel gray-scale values are less than or equal to a first threshold, and a difference between the plurality of sub-pixel gray-scale values is greater than or equal to a second threshold, and the first threshold is greater than the second threshold; and a display panel, which displays an image screen according to the adjusted pixel signal, wherein the pixel compensation circuit compensates the plurality of sub-pixel gray-scale values according to a compensated gray-scale value, and a sum of the compensated gray-scale value and the plurality of sub-pixel gray-scale values is less than or equal to a reference gray-scale value.

2. The electronic device according to claim 1, wherein the pixel compensation circuit is disposed in a timing controller or a source driver.

3. The electronic device according to claim 1, wherein the image screen comprises a first region and a second region, the first region encloses the second region, and the pixel compensation circuit compensates the pixel signal of a pixel in the second region.

4. The electronic device according to claim 1, wherein the display panel comprises a first data line and a second data line, and the pixel compensation circuit increases a data voltage written into the second data line to reduce a difference between a data voltage written into the first data line and the data voltage written into the second data line.

5. The electronic device according to claim 1, wherein in the display panel, the same data line is electrically connected to sub-pixels located in different pixel columns.

6. The electronic device according to claim 1, wherein the compensated gray-scale value is a fixed value.

7. A driving method for an electronic device, comprising:

receiving a pixel signal, wherein the pixel signal comprises a plurality of sub-pixel gray-scale values;

determining a compensated gray-scale value of the plurality of sub-pixel gray-scale values according to the plurality of sub-pixel gray-scale values, wherein a sum of the compensated gray-scale value and the plurality of sub-pixel gray-scale values is less than or equal to a reference gray-scale value;

compensating the plurality of sub-pixel gray-scale values based on a determination result to output an adjusted pixel signal, wherein the determination result indicates that the plurality of sub-pixel gray-scale values are less than or equal to a first threshold, and a difference between the plurality of sub-pixel gray-scale values is greater than or equal to a second threshold, and the first threshold is greater than the second threshold; and driving a display panel to display an image screen according to the adjusted pixel signal.

8. The driving method for the electronic device according to claim 7, wherein the driving method is performed by a pixel compensation circuit in the electronic device, and the pixel compensation circuit is disposed in a timing controller or a source driver.

9. The driving method for the electronic device according to claim 7, wherein the image screen comprises a first region and a second region, the first region encloses the second region, and the driving method compensates the pixel signal of a pixel in the second region.

10. The driving method for the electronic device according to claim 7, wherein the display panel comprises a first data line and a second data line, and a data voltage written into the second data line is increased to reduce a difference between a data voltage written into the first data line and the data voltage written into the second data line.

11. The driving method for the electronic device according to claim 7, wherein in the display panel, the same data line is electrically connected to sub-pixels located in different pixel columns.

12. The driving method for the electronic device according to claim 7, wherein the compensated gray-scale value is a fixed value.

* * * * *